United States Patent [19]

Harris

[11] Patent Number: 4,812,553

[45] Date of Patent: Mar. 14, 1989

[54] PREPARATION OF UNSATURATED POLYESTERS USING BIS-HYDROXYALKYL ESTERS OF AROMATIC DICARBOXYLIC ACIDS

[75] Inventor: Stephen H. Harris, West Chester, Pa.

[73] Assignee: Arco Chemical Technology, Inc., Wilmington, Del.

[21] Appl. No.: 109,125

[22] Filed: Oct. 16, 1987

[51] Int. Cl.$^4$ .............................................. C08G 63/02
[52] U.S. Cl. .................... 528/272; 528/296; 528/297; 528/302; 528/303; 528/304; 528/306; 528/392; 528/396; 525/418; 525/450; 525/451
[58] Field of Search ............... 528/296, 272, 297, 302, 528/303, 304, 306, 392, 396; 525/418, 450, 451

[56] References Cited

U.S. PATENT DOCUMENTS

| | | | |
|---|---|---|---|
| 3,252,941 | 5/1966 | Mayer et al. | 260/75 |
| 3,997,511 | 12/1976 | Batzer et al. | 260/75 N |
| 4,306,056 | 12/1981 | Miyamoto et al. | 528/297 |

*Primary Examiner*—John Kight
*Assistant Examiner*—Samuel A. Acquah
*Attorney, Agent, or Firm*—Lewis J. Young

[57] ABSTRACT

The novel polyesters are prepared by direct esterification of bis-hydroxyalkyl esters of aromatic diacids with unsaturated diacids or their anhydrides. These polyesters differ from the prior art polyesters in that they have alternating structures of saturated and unsaturated esters.

9 Claims, No Drawings

PREPARATION OF UNSATURATED POLYESTERS USING BIS-HYDROXYALKYL ESTERS OF AROMATIC DICARBOXYLIC ACIDS

BACKGROUND OF THE INVENTION

Unsaturated polyester resins with a novel structure are prepared from monomeric hydroxyalkyl esters of aromatic dicarboxylic acids. The diesters are prepared from the reaction of diacids with alkylene oxides. These resins are produced in less time and are equivalent in performance relative to standard polyesters.

Unsaturated polyesters are prepared in two fashions; single stage esterifications, where all the ingredients are added initially, and a two-stage cook, where the slow reacting saturated diacid is esterified first before adding the unsaturated diacid. With the first method, random copolymerizations occur with phthalic anhydride and block esterifications, with the unsaturated groups internal, occur with isophthalic or terephthalic acid. The two-stage cook produces block polymers with the unsaturation at the ends of the polymer chain. The latter method produces polyesters with superior heat and corrosion resistance. However, it is time consuming.

Mayer, U.S. Pat. No. 3,252,941 devised a method for lowering the time necessary for the reaction, but it suffers from a lowering of the physical properties of the cured plastic.

Miyamoto et al, U.S. Pat. No. 4,306,056 used propylene oxide as an esterification agent for isophthalic acid by direct esterification to yield a high molecular weight isophthalic oligoester. This process is highly complicated and does not reduce the esterification time in the second stage—the slowest section of a two-stage cook.

SUMMARY OF THE INVENTION

I have now found that novel polyesters are prepared by direct esterification of bis-hydroxyalkyl esters of aromatic diacids with unsaturated anhydrides or diacids to form unsaturated polyesters having alternating structure of saturated and unsaturated esters.

DETAILED DESCRIPTION OF THE INVENTION

The unsaturated polyesters of the present invention differ from those of the prior art in that they consist of alternating units of saturated and unsaturated esters.

The polyesters have the general formula

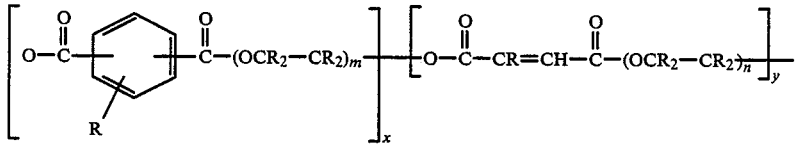

where $m+n$ is $\geq 1.9$; R may be hydrogen, alkyl, aralkyl, or aryl, and the various R's may be the same or different; and the ratio of x:y may be from 1:1 to 1:4, preferably 1:1.

The aromatic dicarboxylic acids useful in the present invention are phthalic acid, isophthalic acid and terephthalic acid and their alkyl or aryl substituted derivatives.

The unsaturated acid can be derived from maleic acid, maleic anhydride, fumaric acid, itaconic acid, citraconic acid, mesaconic acid and the like.

The unsaturated polyesters are prepared by condensation of the unsaturated acid or anhydride with the diester reaction product of the unsaturated diacid with an alkylene oxide.

The ratio of moles of saturated diester to unsaturated diester in the polyester can be 1:1 to 1:4, with 1:1 being preferred for optimum performance improvements. An excess of glycol units relative to acids is desired to regulate the acid number and viscosity of the resin. This excess can be varied from 1–20 mole-% based on total acids and can be derived from the alkylene oxide used to prepare the hydroxyalkyl diester, or it can be different.

After condensation to the desired molecular weight, which will vary depending upon the final application, the unsaturated polyester is diluted in an unsaturated monomer for viscosity reduction. The monomer can be, for example, styrene, vinyl toluene, methyl methacrylate, and the like.

The following examples are meant to further illustrate, but not limit, the invention.

EXAMPLE I

Into a 1 liter autoclave was added 249 g (1.5 moles) of isophthalic acid. Propylene oxide, 261 g (4.5 moles), and 1.5 g of triethylamine were added and the reactor flushed and then pressurized to 150 psig with nitrogen. The whole was heated for 90 minutes at 100° C. After cooling to ambient temperature, the residual acid was filtered and the excess propylene oxide was removed at reduced pressure to give a viscous, yellow liquid ester in 84–95% yield based on unreacted isophthalic acid. The acid number was 15–20 on a solids basis. A portion of the product was hydrolyzed with caustic and the aqueous solution was analyzed by gas chromatography. Dipropylene glycol content, expressed as a function of the total glycols, was 4–7 weight percent.

The product was dissolved in 600 ml of methylene chloride and extracted with 30 ml of 10% HCl, and three 30 ml portions of water. After removal of the solvent and water, the product was suitable for esterification. Reaction of 490 g of the ester product, (18.8 acid number, 5.5% dipropylene glycol content), with 165 g of maleic anhydride and 36.9 g of propylene glycol (10% excess), gave an unsaturated polyester with an acid number of 5.4 and a Gardner-Holt viscosity of a 60% solids solution of zero. The Gardner color was 1–2. Without the acid wash, the Gardner color of the polyester was 4–5.

EXAMPLE II

Into a 1 liter autoclave was added 332 g of isophthalic acid, 255 g of propylene oxide and 4 g of triethylamine. The mixture was heated to 100° C., and after 20 minutes the exothermic reaction heated the contents to 150° C. The reactants were cooled to 100° C. and allowed to react for a total of three hours. Methylene chloride was added to the reactor after cooling to ambient temperature and the amber contents removed, no acid remains.

Extraction of the solution with 10% aqueous phosphoric acid and removal of the solvent gave a light yellow, fluid ester product with an acid number of 0.5 and a dipropylene glycol content of 6%.

COMPARATIVE EXAMPLE A

Into a 2 liter 5-neck flask fitted with a nitrogen inlet, thermometer, sampling port, stirrer and reflux condenser and maintained at 110° C., was added 2 moles of isophthalic acid and 4.4 moles of propylene glycol. After 6 hours at 190°–200° C. pot temperature, a polyester was prepared with an acid number of 15.1. The mass was cooled to room temperature and 2 moles of maleic anhydride was added. The esterification was conducted at 200°–225° C. for 6 hours to give a final resin with an acid number of 10.9 and Gardner-Holt viscosity of Q when diluted to 60% solids with methyl cellosolve. The resin was diluted to 65% solids in styrene and inhibited with 100 ppm of tert-butyl catechol.

EXAMPLE III

Bis-hydroxypropyl isophthalate (1.68 moles), with an acid number of 15.7 and a molecular weight determined by saponification equivalent of 285, was added to the resin flask used in the comparative example A. An equimolar amount, 1.68 moles, of maleic anhydride was added along with 36.9 g of propylene glycol; the amount is equal to the moles of acid in the diester plus a 10 mole-% excess on total acid functionality. The esterification was conducted in an identical manner to the second stage esterification of the comparative example. At the end of 6 hours the polyester had an acid number of 5.4 and a Gardner-Holt viscosity of O, as a 60% solids solution. This resin was diluted in inhibited styrene to 65% solids.

EXAMPLE IV

Bis-hydroxypropyl isophthalate (528.8 g), acid number 16 and molecular weight of 285, was added along with 1.85 moles of maleic anhydride and 34.6 g of propylene glycol. The excess of glycol relative to acids was 8 mole-%. Esterification conducted for 6 hours in the manner above, gave a resin with a 7.5 acid number and P Gardner-Holt viscosity as a 60% solids solution. The resin was diluted in styrene. The acid number-time relationship between the comparative example and Examples III and IV is shown in Table I.

TABLE I

| Time, Min | Acid Number for Example | | |
|---|---|---|---|
| | A | III | IV |
| 100 | 35 | 26 | 34.5 |
| 150 | 27.5 | 19 | 26 |
| 200 | 21.5 | 13.5 | 19 |
| 250 | 16.5 | 9 | 13.5 |
| 300 | 13 | 6.5 | 9.5 |
| 340 | 11.5 | 5.5 | 7.5 |

It can be seen that the esterifications of the invention proceed at a faster rate than that of the comparative example.

COMPARATIVE EXAMPLE B

Isophthalic acid and propylene glycol were reacted in the same manner as comparative example A to an acid number of 11.8 at 100% solids. Fumaric acid, 2 moles, was added at room temperature and the mass was further esterified over the course of 6 hours to give a resin with a 60% solids acid number of 9.0 and a Gardner-Holt viscosity of P.

EXAMPLE V

Bis-hydroxypropyl isophthalate, 500 g, molecular weight 280, was added, along with 207 g of fumaric acid and 38.5 g of propylene glycol, to the esterification flask. After 5 hours at the same conditions as the comparative example B, the resin had an acid number of 9.8 and a Gardner-Holt viscosity of M-N as a 60% solids solution. The acid number-time relationship is shown in Table II.

TABLE II

| Time, Min | Acid Number for Example | |
|---|---|---|
| | B | V |
| 100 | 39 | 34 |
| 150 | 29 | 23 |
| 200 | 23 | 18 |
| 250 | 17 | 13 |
| 300 | 12.5 | 9 |
| 340 | 11 | 8 |

Again, it can be seen that the esterification of the present invention has a faster rate than that of the comparative example.

I claim:

1. A method of preparing novel polyesters comprising condensing (a) unsaturated diacids or their anhydrides with (b) a monomeric bis-hydroxyalkyl ester of an aromatic diacid in a mole ratio of (b):(a) of about 1:1.

2. The method of claim 1 wherein said unsaturated diacid is selected from the group consisting of maleic acid, fumaric acid, itaconic acid, citraconic acid and mesaconic acid and their anhydrides.

3. The method of claim 1 wherein said aromatic diacid is selected from phthalic acid, isophthalic acid, terephthalic acid and their alkyl and aryl derivatives.

4. The method of claim 1 wherein the hydroxyalkyl ester of the aromatic dicarboxylic acid is formed from alkylene oxides having from 2–10 carbon atoms.

5. The polyesters made by condensation of a dialkyl ester of a saturated aromatic dicarboxylic acid with an unsaturated dicarboxylic acid or its anhydride, said polyester having the general formula

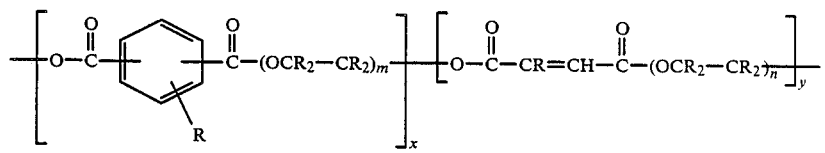

where $m+n$ is $\geq 1.9$; R may be hydrogen, alkyl, aralkyl, or aryl, and the various R's may be the same or different; and both x and y are 1.

6. The polyesters of claim 5 wherein said aromatic dicarboxylic acid is selected from phthalic acid, isophthalic acid, terephthalic acid and their alkyl and aryl derivatives and wherein the dialkyl ester of the aromatic dicarboxylic acid is formed from alkylene oxides having from 2-10 carbon atoms.

7. The polyesters of claim 5 wherein said unsaturated dicarboxylic acid is selected from the group consisting of maleic acid, fumaric acid, itaconic acid, citraconic acid and mesaconic acid and their anhydrides.

8. An alternating copolyester of bis-hydroxypropyl isophthalate and maleic anhydride.

9. An alternating copolyester of bis-hydroxypropyl isophthalate and fumaric acid.

* * * * *